United States Patent Office 3,061,610
Patented Oct. 30, 1962

3,061,610
PROCESS OF PREPARING 1-BETA-PYRIDYL CARBONYL-2-PROPANOIC ACID
Henri Albert Dumesnil, 10 Rue du Platre, Paris, France
No Drawing. Filed June 27, 1958, Ser. No. 744,923
4 Claims. (Cl. 260—295)

The present invention relates to a new benzimidazyl derivative and its preparation and more particularly to benzimidazyl 1-(β-pyridyl carbonyl)-2-propanoic acid having the formula

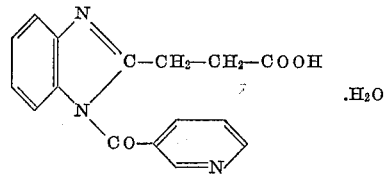

.H₂O

The present application is a continuation in part of my copending application Serial No. 551,520, filed Dec. 7, 1955, now abandoned.

The new benzimidazyl derivative, which may also be called 1-nicotinoyl benzimidazole-2-propionic acid, is a white crystalline powder soluble in distilled water but more soluble in hot water than in cold water. It is soluble in methanol and ethanol but insoluble in ether and other organic solvents, soluble in alkaline solutions and in aqueous acidic solutions. In its crystalline form, its melting point is 179–180° C. It is characterized by a sweetening power which is perceptible at 1:1000 dilution and by Vitamin $B_{12}$-like activity.

The new derivative is prepared by reacting 2-(ethyl-2-carboxy)-benzimidazole with nicotinic acid by heating the reactants in the presence of a diluent in which the reaction product has little solubility, the heating being preferably carried out at the temperature of reflux of the diluent which may be water, ethanol, acetone and mixtures thereof.

The new derivative is useful as a synthetic sweetening agent, particularly for the obese or for diabetics and is not metabolized like carbohydrates. It is also useful for its Vitamin $B_{12}$-like activity in which connection it has the advantages over Vitamin $B_{12}$ in that it is a well defined substance and more readily assimilable. It is further useful as an anti-anemic in the treatment of Biermer's anemia and is non-toxic as shown by acute and chronic toxicity tests carried out on mice and rabbits by intramuscular or sub-cutaneous administration, from which tests no toxicity was apparent in dosages ranging from 1 to 1000 milligrams per kilogram of animal weight either as a single dose or over a period of 40 days. Autopsies of sacrificed animals revealed no evidence of morbid or toxic phenomena. In treating Biermer's anemia, for example, the new benzimidazyl derivative can be used in any desired dosage form such as in pure powder form alone or combined with any pulverulent excipient (starch, talc, calcium carbonate, etc.), as compressed tablets, or in solution in water, alcohol or glycerine with or without a glycol thickener or in oil or other suspensions. The liquid forms can also be packaged as aerosols and the oily suspensions can be prepared as injectables. The derivative can also be formulated as suppositories using as a base coco butter or polyethylene glycol. The intramuscularly injectable form is administered in a dose of 3 to 100, preferably 50, milligrams per day.

The 2-(ethyl-2-carboxy)-benzimidazole is prepared as follows:

10.8 grams (0.1 mol) of o-phenylene diamine and 20 grams of pure succinic acid are boiled for 3 hours in 4 or 5 N HCl. After cooling, the mixture is left overnight in a refrigerator to precipitate excess succinic acid and the succinate of o-phenylene diamine and then filtered. The filtrate is neutralized with 5 N caustic soda to pH 5 and then saturated with sodium acetate addition and the whole refrigerated for 24 hours. The 2-(ethyl-2-carboxy)-benzimidazole which crystallizes out is separated and dried and then washed with iced distilled water. The crude product obtained is dissolved in boiling distilled water, decolored with animal black and filtered while still boiling. The filtrate is maintained at the boil and 1% $KMnO_4$ added. The excess of $KMnO_4$ and the $MnO_2$ formed are eliminated by the addition of a few drops of 5% sodium bisulfite. The clear solution resulting is cooled in the open air and then placed in a refrigerator. On the next day, the crystals of pure 2-(ethyl-2-carboxy)-benzimidazole are dried.

The nicotinate salt is prepared as follows:

19 grams of 2-(ethyl-2-carboxy)-benzimidazole and 12 grams of nicotinic acid are suspended in 100 milliliters of 50% ethanol and heated gently under agitation. The solution becomes clear at about the boiling point of the hydroalcoholic solution and heating is continued until the solution thickens whereupon boiling is continued for another 5 minutes and then the solution allowed to cool. The crystals thus obtained are washed with 3 portions of distilled water, twice with 10 milliliters of ethanol and twice with 10 milliliters of sulfuric ether and then dried. A diluent other than aqueous ethyl alcohol can be used such as pure ethyl alcohol, pure water or acetone or mixtures of such diluents. The new benzimidazyl derivative is further useful in the synergistic combination with a thiolpropionate and a cobaltithiopropionate in accordance with said application 551,520, for example, by combining 100 milligrams of sodium thiolpropionate, 4.5 milligrams of sodium cobaltithiopropionate and 50 milligrams of the nicotinate of 2-(ethyl-2-carboxy)-benzimidazole in 5 milliliters of distilled water.

What is claimed is:

1. The method of preparing 1 - nicotinoyl benzimidazole-2-propionic acid which comprises heating 2-(ethyl-2-carboxy)-benzimidazole and nicotinic acid in a diluent in which the product of reaction is substantially insoluble and isolating the product of reaction thus formed.

2. The method of claim 1, in which the heating is carried out at the temperature of reflux of the diluent.

3. The method of claim 1, in which the diluent is selected from the group consisting of ethanol, aqueous ethanol, acetone, water and mixtures thereof.

4. The method of claim 1, in which the reactants are used in the respective proportions of about 19 grams and 12 grams.

References Cited in the file of this patent

Magistretti: Chem. Abstracts, vol. 50, col. 10210 (1956).